APPARATUS FOR PRODUCING MAGNETIC RECORDING MATERIALS

Filed Jan. 31, 1962 6 Sheets-Sheet 1

INVENTORS
GEORGE W. GREENE
BERNARD LELAND
JOHN PONSEN
GEORGE R. SCHLUPP
EUGENE J. SCRAY, JR.
RONALD Mc C. WILKIE
ROLLAND K. WILTSE

BY SUGHRUE, ROTHWELL, MION & ZINN
ATTORNEYS

APPARATUS FOR PRODUCING MAGNETIC RECORDING MATERIALS

Filed Jan. 31, 1962 6 Sheets-Sheet 2

Aug. 16, 1966 G. W. GREENE ETAL 3,267,017

APPARATUS FOR PRODUCING MAGNETIC RECORDING MATERIALS

Filed Jan. 31, 1962 6 Sheets-Sheet 3

APPARATUS FOR PRODUCING MAGNETIC RECORDING MATERIALS

Filed Jan. 31, 1962 6 Sheets-Sheet 4

APPARATUS FOR PRODUCING MAGNETIC RECORDING MATERIALS

Filed Jan. 31, 1962 6 Sheets-Sheet 5

United States Patent Office 3,267,017

Patented August 16, 1966

3,267,017

APPARATUS FOR PRODUCING MAGNETIC RECORDING MATERIALS

George W. Greene, Red Hook, Bernard Leland, Poughkeepsie, John Ponsen, Ulster, George R. Schlupp, Saugerties, Eugene J. Scray, Jr., Rosendale, Ronald McC. Wilkie, Esopus, and Rolland K. Wiltse, Woodstock, N.Y., assignors to International Business Machines Corporation, New York, N.Y., a corporation of New York Filed Jan. 31, 1962, Ser. No. 170,141

5 Claims. (Cl. 204—210)

The present invention relates to magnetic recording materials and to methods and apparatus for the production of such materials. More specifically, the invention is directed to processes and apparatus for continuously producing a plated magnetic recording medium, such as a tape.

In order to meet the requirements of modern, high-speed data processing equipment employing magnetic recording tapes, it is essential to optimum performance of the apparatus that tapes be made available which have extremely high quality and performance characteristics. Magnetic recording tapes for such use generally comprise a flexible, non-conducting substrate, such as a tape of synthetic plastic material and a coating of a magnetic composition, metal or alloy on the surface of the base.

Heretofore, a number of processes have been available for the production of magnetic recording tapes of this general type, but none of the known processes provides a tape having the properties necessary to meet the needs of modern recording devices.

Among the common prior techniques for producing such tapes is a method comprising the application of a composition of magnetic oxide and an adhesive binder to the surface of a non-conducting tape. Since approximately fifty percent of the volume of such coatings are made up of the adhesive binder, it is necessary that considerable thicknesses be built up in order to obtain the desired level of output. Recording tapes of this type also are found to have a rough surface and do not provide the desired conformity of magnetic recording heads. Bit density capability of such tapes is also quite low.

Another conventional method for producing magnetic recording tapes comprises electroplating a film of magnetic material on a temporary conductive substrate having low adherence for the magnetic film. The electroplated layer is then transferred to an adhesive coating carried on the surface of the non-conducting base. This method is limited in that it is necessary to deposit a fairly thick layer of magnetic metal or alloy in order to obtain a good transfer. Also, the smoothness and adherence of the magnetic film to the base is dependent on the adhesive and the exact control of the transfer. In general, it is not possible to obtain uniformly smooth and adherent films by this process.

It has also been proposed to produce tapes of the present type by preliminarily depositing a thin film of magnetic metal on a non-conducting base by cathode sputtering, vacuum deposition or the like and then electrodepositing a magnetic layer on the precoat. The products of this method are also objectionable with respect to the smoothness, continuity and adherence of the magnetic film to the base.

Accordingly, it is a general object of the present invention to produce a magnetic recording tape by applying a coating of magnetic metal or alloy onto a continuous web of non-conducting material to produce a dense, smooth, highly adherent magnetic film which can be applied in extremely thin layers and still provide the required properties of remanent magnetization, coercivity, high bit density and stability under high speed operation.

Another object of the invention is to provide, on an economically practicable basis, a magnetic recording tape having extremely high bit density capability, smoothness and strength and which comprises an adherent and high density film of magnetic metal or alloy adhered to a non-conducting substrate.

It is another general object of the present invention to provide a method and apparatus for continuously producing magnetic recording tapes of the present type which are substantially free of pin holes, surface roughness, variations in thickness and similar magnetic film defects which result in less than optimum performance when employed in data processing equipment.

The more specific object of the present invention is to provide a method and apparatus for continuously plating an elongated web of synthetic plastic material with a thin film of magnetic metal or alloy by passing the web sequentially through electroless plating stations and electrolytic plating stations to produce a recording tape having a very dense, smooth, adherent and highly uniform magnetic coating.

An additional object of the present invention is to provide a method and apparatus for producing a magnetic recording tape by continuously drawing a non-conducting web sequentially through electroless plating stations and electrolytic plating stations so that the surface of the web is subjected to minimum scratching, abrasion or other alteration during processing which results in a tape product having significantly superior magnetic and physical characteristics.

It is well known in the art that non-conducting substrates, such as synthetic plastic materials, may be metal plated by various electroless methods. The basic Brenner and Riddell process, for example, provides means for depositing dense metal films on various substrates by the catalytic reduction of a salt of the metal in the presence of a reducing agent. Other investigators in this field noted that good deposition could be effected on non-conducting substrates, such as plastics, by sensitizing the substrate with layers of ions prior to the electroless deposition.

We observed that the metal films produced in accordance with such prior art techniques are extremely dense and uniform and when employed as preliminary conducting films for the subsequent electrodeposition of a magnetic metal or alloy, produce markedly superior magnetic materials, especially characterized by high bit density.

When we attempted to apply these principles to a system for the continuous production of magnetic tape, however, it was found that an entirely unsatisfactory tape product was obtained. After extensive study of the problem, we discovered that the poor results obtained were due at least in major part to the fact that the electrolessly deposited films were highly sensitive to abrasion and that, upon even slight contact with solid surfaces during continuous processing, the electroless deposit was disrupted or removed, so that the subsequent electroplating produced irregular and uneven coatings filled with pinholes and in some instances marred by unplated areas.

In early experiments in our effort to develop a continuous plating system based upon sequential electroless and electrolytic depositions, the plastic web substrate was drawn over a series of rotating rollers through the required sensitizing and electroless plating stations and then to the electroplating stations. This arrangement, however, resulted in serious abrasion of the electrolessly deposited film, even where highly polished rollers were employed and where care was taken to minimize friction between the roller and the web.

A first attempt to overcome these difficulties employed a web having edge slots for receiving the teeth of a sprocket guide which was used to advance the web and guide it through the processing operation. Such a guide and web control means, however, also proved to be unsatisfactory in that the limited, edge contact between the sprocket and the web resulted in undesired plating of the sprocket itself due to the carry-over of material from the various chemical treating and plating stations. In relatively short time, the sprockets became so heavily plated as to be inoperable and had to be replaced. Supporting and advancing the web by physical contact with its edges in this manner also resulted in buckling of the web during treatment and yielded an uneven surface.

A further disadvantage which appeared in all attempts to utilize sequential electroless plating and electroplating in the continuous production of magnetic recording tape was the tendency of the web to carry chemicals from one treating station to the next and to deposit materials on any of the web guiding apparatus contacted. This material carry-over rapidly caused the contamination of one treating solution with material from the prior solution. Also, even where the carry-over was water from a spray rinse station, the dilution of the next bath was undesirable since it would alter the concentration of the bath and result in uneven pre-treatment or plating, either in the electroless or in the electroplating stage of the process.

After considerable investigation, we discovered that a non-conducting plastic web could be continuously plated with a film of magnetic metal or alloy by pulling or drawing the web sequentially through electroless and electroplating stations and by guiding the web in its progress through the system by means of a series of fluid bearings. By proper utilization of such bearings, it was found possible virtually to eliminate surface defects in the tape.

By the use of special fluid bearings it was also found possible to maintain the web in proper alignment throughout the process without resort to the use of conventional edge guiding devices.

By the present method and apparatus, it was also found possible to eliminate material carry-over between successive plating and treating stations by utilizing the fluid as a web cleaning and/or drying means.

It was also found that a superior tape could be produced by supporting the web solely on a current of fluid throughout the pretreating, sensitizing and electroless operations, then heating to stabilize the electroless deposit and finally electroplating to form the magnetic film.

After developing the general concept of producing a superior magnetic recording tape by sequentially drawing a plastic web through electroless sensitizing treatments, electroless plating, heating and electroplating stations, we discovered that certain refinements in the system resulted in significant improvement in the product.

First of all, the problem of aligning and maintaining web alignment in a system wherein there is no direct solid contact with the web is extremely difficult. Web handling systems utilizing fluid bearings in other fields invariably include edge guiding or other direct contact means for maintaining alignment of the web.

In general, we discovered that web alignment could be established and maintained during continuous processing according to the invention by permanently and rigidly mounting the fluid bearings and then reciprocating the treating baths into and out of contact with the web threaded through the bearings. In this manner, the web is immersed beneath the liquid level in the respective baths for treatment without disturbing either the bearings or web once the delicate alignment has been accomplished.

The necessity for reciprocating the tanks into and out of contact with the bearings carrying the web also arises from the manner in which the system is started up. It is desirable to utilize a relatively thick, salvagable leader that is spliced to the final substrate and threaded through the bearings. When the leader is in place, the continuous motion of the web through the machine is commenced and then, once the splice has passed the first bath station in the series of treating bath stations, the corresponding bath is elevated into contact with the web. As the portion of the web which has been treated in the first bath reaches each of several subsequent treatment stations, such subsequent station is put into operation. In this way, no portion of the web is exposed to the action of a treatment station without having been exposed to prerequisite treatments, and contamination to the equipment and its baths which would otherwise result is avoided.

We also discovered, that in view of the chemical nature of a number of the treating baths, it is undesirable to employ air as the fluid bearing medium in those baths. Aside from the foaming and agitation that would be incident to the use of air in the bearings when immersed below the level of a liquid treating bath, the air also has an undesirable oxidizing effect on the chemical constituents making it difficult to control their strength accurately and at an effective level. We discovered that it was possible to overcome this difficulty by utilizing the fluid contained in the bath as the fluid bearing medium for any bearings immersed below the liquid level of a particular treating tank.

The present invention will perhaps be better understood by reference to the following description together with the accompanying drawings which represent by way of illustration a preferred embodiment of the present invention and the best mode which has been contemplated for applying the principles of the invention.

In the drawings:

FIGURES 1*a*, 1*b*, 1*c* and 1*d* comprise a somewhat schematic, side cross-sectional view of the continuous web plating apparatus in accordance with the present invention;

*General description*

Figures 1, 1A:
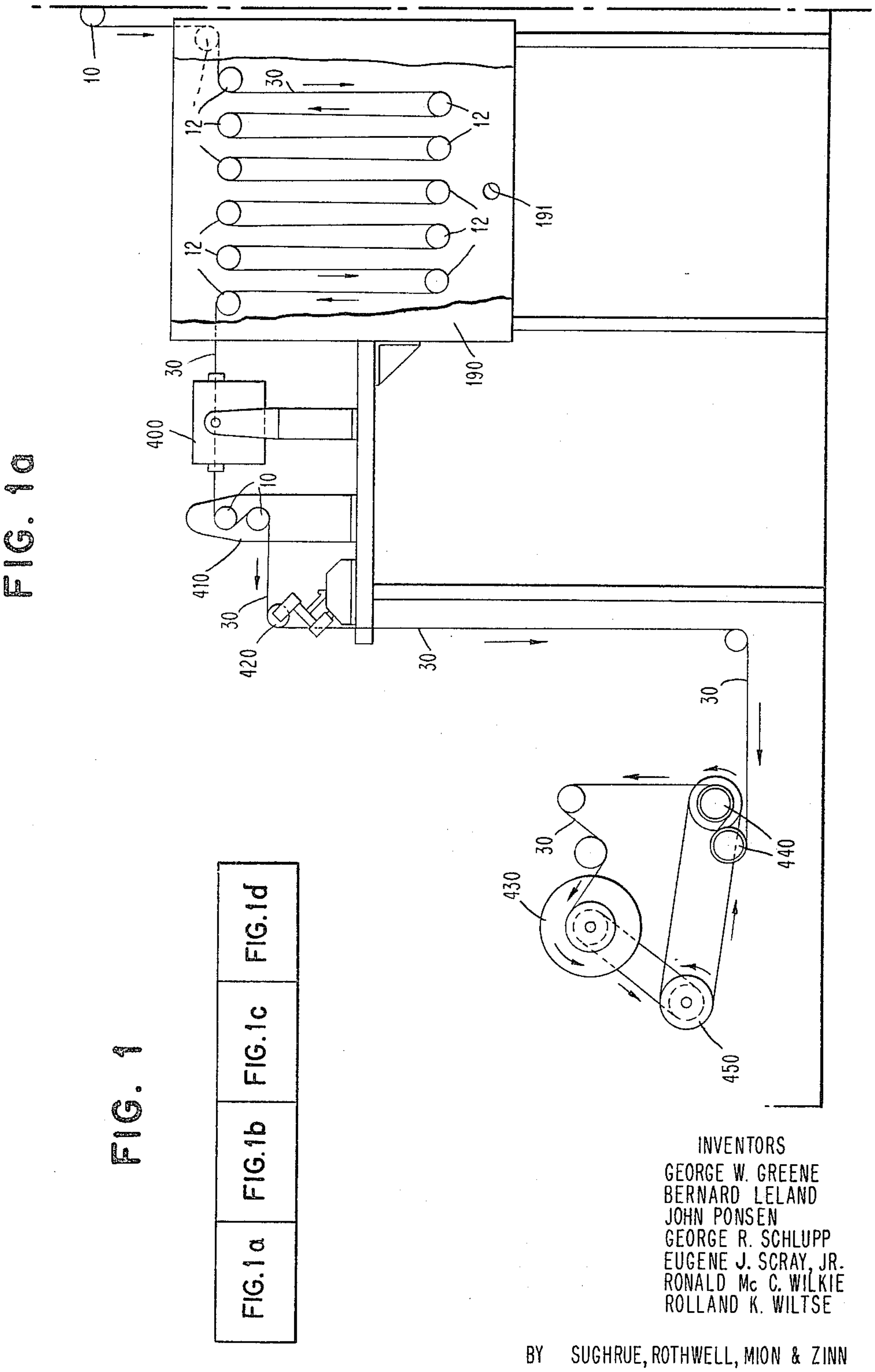

Before considering the system of apparatus and the process of the present invention in detail, it is thought that a general consideration of the underlying process will assist in a complete understanding of the invention.

According to the present invention magnetic materials of superior properties are provided comprising a non-conducting web, an intermediate electrolessly plated metal film and an electroplated magnetic over-layer. By the present method, a web of material providing the substrate of the magnetic recording tape is fed through the steps of the system, is introduced between the driven takeup rollers and is wound upon a storage reel. For convenience in discussion, the processing system may be considered as having three major stages, the electroless plating stage, the heat stabilizing stage and the electroplating stage.

*The electroless stage*

In the electroless stage of the system, a web taken from a supply reel is fed over a series of bearings under proper tension and in the desired alignment. The web is first introduced into a pre-washing station where the surface of the web is subjected to sprays of wash water which may contain a wetting agent. The web is then passed over a fluid bearing wherein the fluid is hot air which not only cushions the web but also dries it, so that there is no water carry-over to the following treating station.

In the next station, the web is subjected to surface preparation by contact with a solution of a sodium dichromate, water and sulphuric acid. It is very desirable that the foregoing strong treating solution be cleaned from the surface of the web and so the surface of the web is sprayed with water to rinse residual chemicals.

Next the web is introduced into a hot solution of sodium hydroxide which further prepares the web surface for the reception of the ion sensitizing solutions.

After the sodium hydroxide treatment, the web is rinsed and is drawn through a sensitizing solution of stannous chloride which deposits a layer of tin ions on the film.

The web is again rinsed and is drawn through a second sensitizing solution of palladium chloride and again rinsed.

The pre-treated and sensitized web is then introduced into the electroless deposition tank for a period of time necessary to develop the desired thickness of metal.

When the electroless deposition has been completed, the web is rinsed and drawn through a drying oven to stabilize the electroless deposit and to improve its adherence to the substrate.

Throughout the sequence of operations necessary to deposit the electroless film of metal and after the electroless film has been produced on the substrate, the surface of the web must be handled with extreme care so that virtually no discontinuity is introduced into the film. If such care is not taken, the resulting imperfect electroless layer provides an unsatisfactory base for electro-deposition and yields a poor tape product.

If this film is subjected to any substantial frictional contact, it is removed and will not receive a proper electroless deposit. Even if the electroless deposit is substantially perfect, it is still adhered to the substrate through the aforementioned highly sensitive and mobile intermediate layer and so any frictional force on the electroless top layer will result in its being easily disrupted or displaced and eventually will lead to imperfections in the plated product.

The theory underlying the foregoing situation is not entirely understood. The necessity of the heat stabilizing treatment may be accounted for on the proposition that the electrolessly deposited layer is initially highly mobile on the substrate web on account of hydration of the surface of that web whereby bonding forces at that surface are relatively weak. According to this theory, the heating step sets the bond by removal of the underlying layer of water of hydration. In any case, heating and drying have been found to stabilize the bond.

To insure that the plating will be perfect in every respect, the web is handled throughout all of the electroless plating operations without any frictional contact with a solid surface. This is achieved, as already briefly noted, by drawing the web over a series of fluid bearings which minimize friction, prevent chemical carry-over between successive stations and maintain proper alignment of the web throughout the process.

*The electrolytic stage*

After the stabilized electroless deposit has been produced on the substrate, it is then drawn through the electrolytic stage of the system. As in the electroless stage, it is also desirable that the web be handled with a minimum of surface contact, so that a smooth, dense and uniform magnetic layer is obtained. Thus, in the electrolytic stage, the web is also handled by being drawn over a series of fluid bearings, with the exception that the electroless film is brought into direct contact with the cathode of the electroplating cell, generally a rotating, conductive, contact roller.

In general, the electrolessly coated web is first passed through a depassivation treatment for the removal of any surface oxide produced during the heat treatment of the electroless film.

The web is then rinsed and introduced into an electroplating station where it is contacted directly by a cathode contact roller, and is passed as a cathode through a solution of electrolyte containing a suitable anode. It is generally desirable that the electroplating be carried out in a series of stages with gradually increasing plating current. This is due to the fact that the electroless film has a fairly high resistance, so that when a high current is impressed through the electroless layer overheating results and the plastic substrate deteriorates. By gradually building up the electrodeposited layer by plating with incrementally increased current at a series of plating stations, this difficulty is avoided.

After an electrodeposited layer of magnetic material of the desired thickness is produced, the magnetic film is dried by a heat treatment and may be wound upon a take-up reel.

*The apparatus*

The apparatus of the present invention comprises a series of stationary fluid bearings 10, 11 and 12 permanently mounted on brackets 15 carried by vertical supports 20. The fluid bearings are more fully described hereinafter and are illustrated in FIGURES 2–7 of the drawings.

The series of fluid bearings defines a continuous processing path for the plastic web 30 which is to be plated with a magnetic metal or alloy. Beneath the series of fluid bearings are positioned a plurality of tanks 40 through 50, inclusive, which are mounted on elevator platforms 60, such as Clark-Aiken Hydraulic Lift Tables, so that the tanks may be reciprocated vertically and so that the liquid contained within the tanks may be moved into and out of contact with the web 30 during its progress along the line of fluid bearings. The lifts include a fixed base 61 and cam elevated scissor legs 62. Drive motors, not shown, power a hydraulic ram in base 61 to open and close legs 62, thus raising and lowering platforms 60.

The depth to which the web-carrying bearings are immersed in the various treating solutions or, to put it another way, the height to which the treating baths are raised may be pre-selected and automatically controlled by determining the level of liquid within each tank by means of overflow dams, not shown, and by automatically controlling the height to which the platform may be raised by means of a limit switches 70 mounted on vertical support columns 20. Each limit switch 70 is placed in circuit with the drive motor for the associated elevator platform 60. When the switch is tripped by raising or lowering platform 60, the motor is automatically cut out and the movement of the tanks is terminated. Similar bath elevation control means are associated with each of the tanks in the system, and all such controls may be tied into a single master control, not shown, which will automatically raise and lower all of the tanks to pre-selected elevations upon actuation of a single control. Spray nozzles 18 for directing deionized rinse water against the surfaces of the web are also suspended from brackets 15 surrounding the web path and are associated with a number of the baths.

It will be apparent that the length of time the web is exposed to a particular treating step is a function of several factors. Assuming that the web is drawn through the system at a constant rate of speed, the length of exposure to an individual treatment will be determined by the length of the web path beneath the liquid level in the particular tank or subject to the impingement of sprayed rinse water.

Flexible conduits, not shown, are attached to each of the treating tanks for drainage and recirculation of the liquid contents whether the tanks are in a raised, lowered or intermediate position. Vents 80 are also mounted on each chemically active treating tank to remove fumes rising from the bath.

Although all of the fluid bearings illustrated in FIGURE 1 are generally similar in structure and function, there are some slight functional differences between individual bearings.

Referring to FIGURES 2–7 of the drawing, it will be seen that the bearings of the present invention generally comprise a hollow cylindrical chamber or tube 100 having a closure 101 at one end and a fluid conduit 102 at the opposite end. Lugs 103 at each end of the bearing are utilized for rigidly mounting the bearing in support brackets 15 with its longitudinal axis transverse to the path of the web 30.

The fluid bearings may be constructed of metal, plastic or other material, depending upon the particular function of the bearing and the conditions to which it is exposed. For example, the bearings utilized in the water spray rinse tanks may suitably be of metal, whereas those employed in the electroplating tank may be of plastic, such as polyvinyl chloride, to prevent the deposition of metal on the surface of the bearing or corrosion of the bearing. In the electroless plating tank the choice of bearing materials is more limited because of the temperatures encountered and the reactive nature of the plating solution; glass, passivated stainless steel, and poly(tetrafluoro-ethylene) are satisfactory.

Longitudinal grooves 105 and circumferential grooves 106 are formed in the surface of the bearing to enclose a generally rectangular area 107 on the curved outer surface of the hollow cylinder. At the apex of the walls of each groove there are a plurality of orifices 108 which communicate with the interior of the bearing for transfer of the fluid pressure medium.

Figures 6, 7:
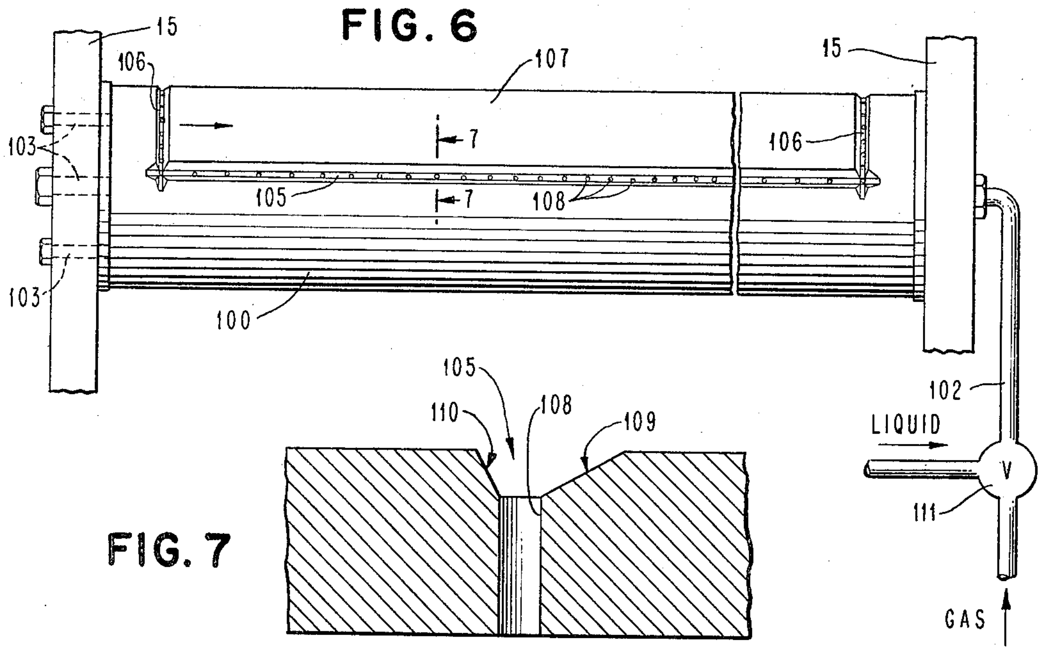
FIGURE 6 is a front, elevation view of a fluid bearing of the present invention.
FIGURE 7 is a cross-sectional view taken along line 7—7 of FIGURE 6.

Referring to FIGURE 7, it will be seen that the grooves are not symmetrical, but rather that one wall 109 is less steeply angled from the apex than the opposite wall 110.

As a fluid pressure medium is forced through conduit 102 into the body of the bearing, through the orifices 108 and out through the grooves 105 and 106, the configuration of the grooves tends to throw the bearing medium towards the center of area 107, under the web, and thus helps to maintain a constant cushion of fluid between the bearing and the web. Directing the fluid medium in this manner also tends to inhibit leakage of the fluid around the edges of the web so that the web is supported entirely on fluid and never touches the bearing.

We have also discovered that a fluid bearing of the present type having grooves in its surface as shown in the drawing, forms a plenum chamber for the self-adjustment of pressure between the web and the bearing. Thus, as the web may tend to lift away from the bearing at one edge and closely approach it at the other, with the danger of abrasion should contact occur, the pressure across the entire face of the web is automatically adjusted through the action of the plenum chamber provided between the grooves 105 and 106 and the web 30.

In their preferred configuration, the bearings of the present invention also maintain a constant fluid cushion between the moving web and the bearings by providing a relatively higher density of orifices near the midpoint of the longitudinal grooves, so that more fluid is supplied at the middle of the web than elsewhere, as most clearly shown in FIGURE 6. This fluid continually moves from the center to the sides of the web to assist in maintaining the desired spacing between the web and the bearing.

It will also be apparent that the surface area 107 of the bearing defined by the grooves will depend on the nature of the wrapping of the web around the bearing. Thus, in the apparatus shown in FIGURE 1, those bearings having the web wrapped around at a right angle, making a half turn at the bearing, will have longitudinal grooves spaced apart approximately 90°. Those bearings about which the web is wrapped to make a full directional turn will have the longitudinal grooves spaced apart approximately 180°. It is apparent that various intermediate spacings of grooves 105 may also be provided corresponding to the specific angle at which the web is wrapped around the bearing in order to maintain a constant fluid cushion between the web and the bearing.

Figures 2, 3:
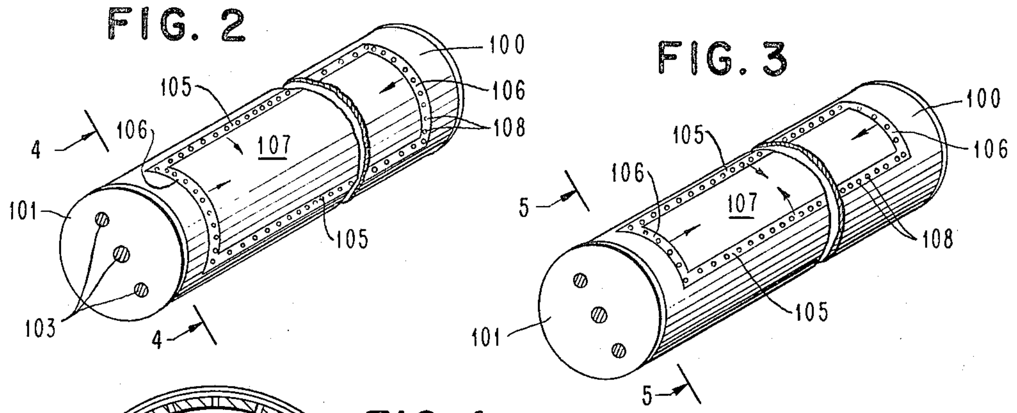
FIGURE 2 is a perspective view of a 180° fluid bearing utilized in the present invention.
FIGURE 3 is a perspective view of a 90° fluid bearing utilized in the invention.
Figure 4:
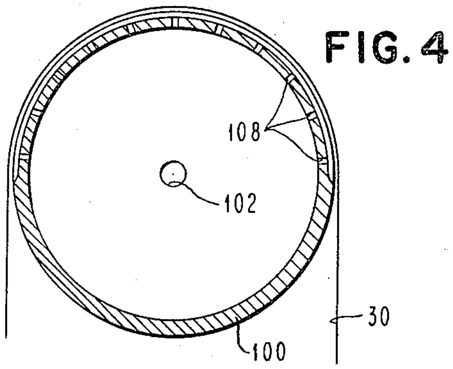
FIGURE 4 is a cross-sectional view taken along line 4—4 of FIGURE 2.
Figure 5:
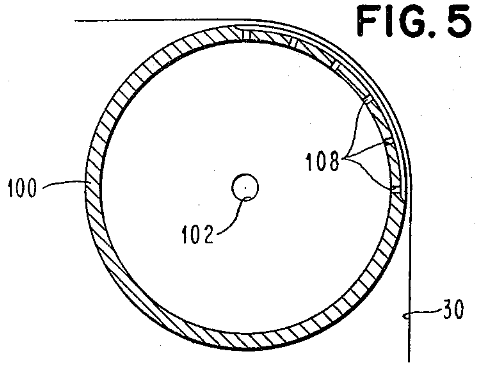
FIGURE 5 is a cross-sectional view along line 5—5 of FIGURE 3.

In the specific bearing shown in FIGURES 2 and 4, the longitudinal grooves 105 are spaced apart approximately 170°. It has been found that it is more efficient to space the grooves slightly less than the angle of wrap of the web. Thus, in the bearing illustrated in FIGURES 3 and 5, the longitudinal grooves are spaced apart at approximately 80° to accommodate a web wrapped at a 90° angle.

The bearings of the present invention, adapted to accommodate a web 24 inches in width, have an outside diameter of approximately three inches and an internal diameter of 2⅞ inches. The bearings are approximately 30 inches long. FIGURES 2 and 3 are broken to indicate that the bearings are proportionately longer than shown in the perspective views.

In bearings of the foregoing dimensions, air is supplied to the inner chamber of the bearings under a line pressure in the order of one-half to ten pounds per square inch to maintain an over-all minimum clearance between the web and the surface of the bearing, at the desired web tension. With bearings of the present structure, an air volume in the order of one-half to five cubic feet per minute is forced through each bearing under the stated input pressure.

Where the bearings 11 are operated with a liquid bearing medium, the liquid input is maintained under a pressure in the order of one to fifteen pounds per square inch, resulting in the circulation of a liquid volume in the order of one to three gallons per minute through each bearing in order to maintain a web to bearing operating clearance.

The apparatus of the present invention also provides means for supplying different fluids to the bearings, depending on their environment and function.

Accordingly, bearings 10 which function primarily as guiding and supporting means and which are never immersed in liquid, are only provided with a conduit 102 for introducing a gaseous bearing medium, generally air.

Another series of bearings 11 is also primarily used for guiding purposes and for supporting the web, but must be able to function in both an air and a liquid environment, when the treating baths are in a lowered or raised position respectively. As illustrated in FIG. 6, the pressure conduits of such bearings are coupled by a valve 111 to a dual fluid system which supplies a gaseous fluid bearing medium when the tanks are in a lowered position and which automatically cuts off the gas and supplies a liquid bearing medium when the bearing is immersed beneath the liquid in a treating bath. The liquid supplied to each liquid bearing is continuously circulated from the bath in which the bearing is immersed and is pumped back under pressure so that there is no dilution of the bath.

A further series of bearings 12 serves a dual function as both guide and supporting means and drying or stripping means. These bearings not only support and direct the web but also prevent chemical carry-over from one bath to the next by evaporating moisture from the surface of the web and by stripping adherent moisture from the surface of the web as it leaves a bath. Bearings of this type may be supplied with air or heated air under pressure.

Returning to FIGURE 1 of the drawing it will be seen that in addition to a plurality of pre-treating, sensitizing and water rinsing treatments, there is also provided an electroless plating tank 45 in which a thin film of metal is continuously deposited upon the moving web.

After the electroless plating step, the web is rinsed in tank 46 and is guided over air bearings 10 into drying oven 90. Only a fragment of drying oven 90 is shown in FIGURE 1*c*, but it is structurally like oven 190 in FIGURE 1*a* and contains a plurality of drying bearings 12. An inlet 191 for circulating additional heated drying air may also be provided in each oven.

In addition to the series of hot air bearings in the oven, the web may be dried and the electroless plating stabilized by circulating a current of warm air through the oven.

After the electroless stage of the operation has been completed, the thickness and continuity of the deposit are sensed by photoelectric inspection devices 200. Since the plastic substrate is normally transparent, the increase in opacity produced by the thin electroless deposit may be measured against a standard to determined whether or not the proper thickness has been achieved. Also, any uncoated portion of the film will register and point up a major defect in the coating. Continuous quality control at this point is important, since the electrodeposited magnetic coating will not adhere to the substrate at those portions which have not received a preliminary electroless deposit and so the final recording tape will contain unplated spots not capable of storing information.

The tape coated with an electroless deposit of metal is then drawn through tank 47 where depassivation is accomplished by exposure of the web to a dilute hydrochloric acid solution.

Next the web is spray rinsed in tank 48, is dried on bearings 12 and is then drawn through electroplating cell 49.

Figure 8:
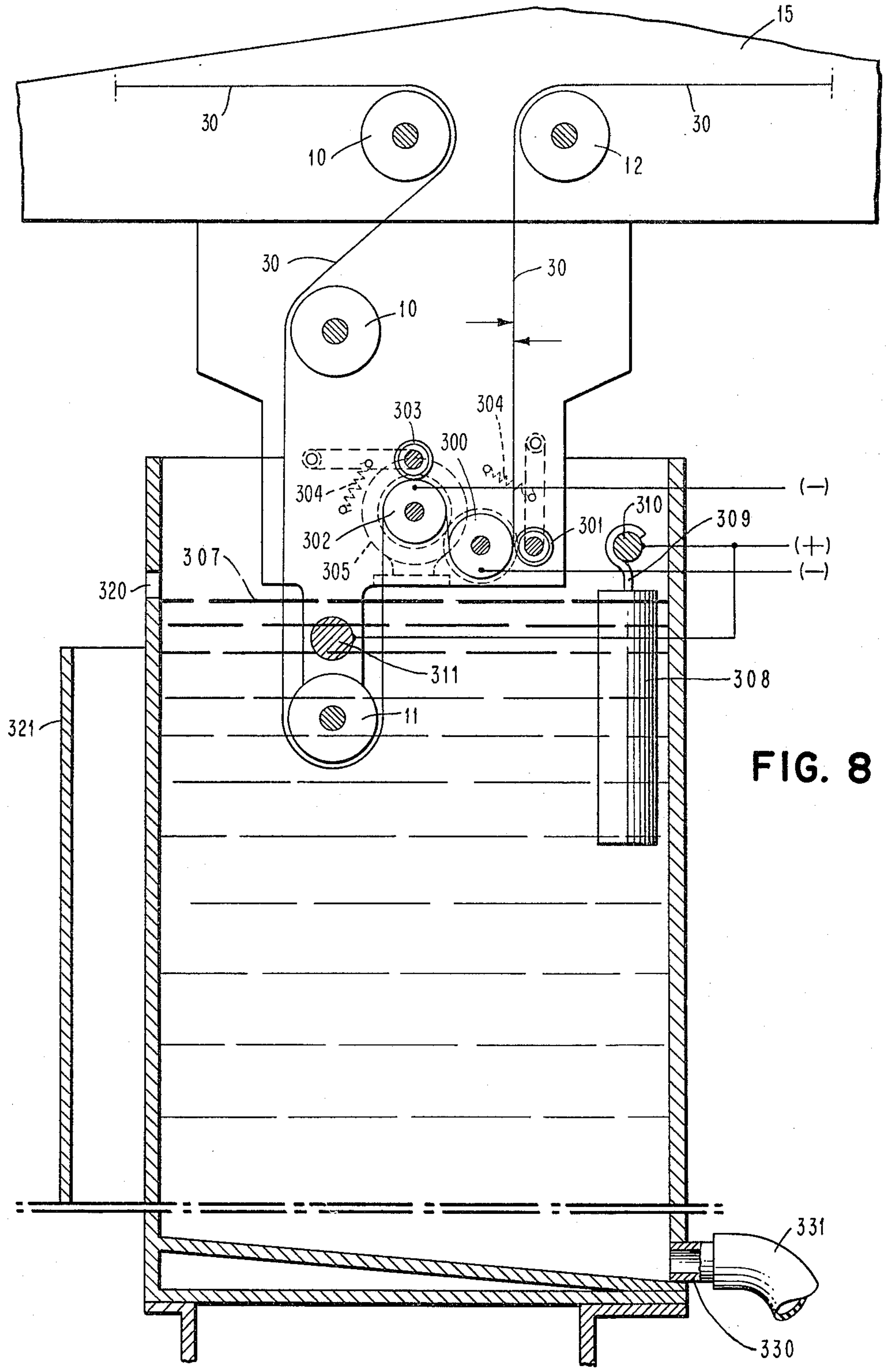
FIGURE 8 is a more detailed side-sectional view of an electroplating station as shown in FIGURE 1*b* of the drawing.

Referring to FIGURE 8 of the drawing, which illustrates in greater detail an electroplating cell in accordance with the teachings of the present invention, it will be seen that the web is guided into the cell over an air bearing 12 between a first cathode contact roll 300 and associated back-up roll 301 and then between a second cathode contact roll 302 and its back-up roll 303. The cathode contact rolls 300 and 302 are preferably gold-plated and are driven by motor 305. The speed of rotation of one of the contact rolls 302 is synchronized with the drive rolls, so that no tension or slack is induced in the web between the respective rolls. The positioning of contact rolls assists in increasing the surface contact made between the web and the contact roll. The back-up rolls 301, 303 are included in the illustrated embodiment to insure satisfactory electrical contact pressure, with the back-up roll 303 associated with the driven roll 302 serving the additional purpose of assuring positive driving contact. Both back-up rolls 301 and 303 are urged against cathodes 300 and 302 by springs 304. The drying of the web on bearings 12 (FIG. 1*b*) prior to electroplating prevents electrotlytic interaction between the electroless film and the cathode roll.

The web is drawn below the surface of the electrolyte, around 180° bearing 11 and in a reverse turn around air bearings 10 which strip residual electrolyte adhering to the surface of the web.

A plurality of anode bars 308 are hung by hooks 309 from an electrical contact crossbar 310 so that they are suspended beneath the surface of the electrolyte. Where, as in the present case, the web is to be plated on both sides, it is preferred that a companion anode be provided. Accordingly, an anode 311 is provided which is hung by supports (not shown) in juxtaposition to the inner side of the tape, to be companion to the first mentioned set of outer side anodes 308. Both the gold-plated cathode contact rolls 300 and 302 and the anode supports are connected to appropriate external current supply.

Overflow outlet 320 and takeoff trough 321 are provided to maintain the electrolyte at the desired level 307. Filling conduit 330 is also provided for continuously supplying fresh electrolyte. As previously noted, such conduits are provided with flexible couplings 331 so that the bath may be raised and lowered without disturbing the connection.

It should also be noted that cathode rolls 300 and 302 contact opposite sides of web 30 so that both sides of the web are plated. The reason for this will be more fully explained hereinafter.

In the preferred embodiment of the apparatus, three additional spray rinse and electroplating stations, not shown, are provided. The added stations have exactly the same structure as the unit illustrated in the drawing and discussed in the preceding paragraphs. In the operation of the additional electroplating units, however, higher current is passed through the web in each successive electroplating cell. In the initial electroplating station, only the extremely thin electroless deposit is available to conduct current through the bath. This film has a relatively high resistance and the application of high plating current results in overheating and destruction of the plastic substrate. After an initial electroplate has been obtained in the first cell, however, more current can be accommodated in the second cell due to the greater combined conductance deposited layers, thus permitting more rapid build-up of the desired thickness of the magnetic metal or alloy.

Additional electroplating stations may be added as needed, each utilizing a higher plating current in order to effect the desired build-up of magnetic film.

After the desired thickness of magnetic metal or alloy has been achieved, the film may be drawn through a bath, not shown, of lubricant such as a silicone fluid. The tape is then drawn through rinsing tank 50 and heating oven 190 to stabilize and dry the electrodeposit.

The tape is then tested at station 400 which comprises magnetic read and write heads for determining the output of the tape and for establishing that the tape has the desired characteristics.

The tape is then wound over bearings 10 in guide stand 410 and is aligned on skewed roller 420 which automatically compensates for misalignment so that an even roll 430 is obtained.

Finally, the web is drawn between driving rolls 440 and is wound upon take-up reel 430 for storage or transfer to a slitting station. Rolls 440 and reel 430 are driven by motor 450.

The drive rollers 440, as already noted, are synchronized with the electroplating contact rolls 302 so that no undue stress or slack is created in the web between the respective rolls.

The rate of rotation of the drive rolls is also utilized to control automatically the proportioning pumps, not shown, which feed reagent to the chemical solution make-up tanks, not shown, for circulation to the various treating baths employed in the system. Thus, if the speed of the web, and accordingly the rate of rotation of the shaft of the motor 450 operating the drive rolls 440 is set at a specific, relatively high value, the pumps feeding reagents to the make-up tanks are automatically adjusted to operate at a relatively high rate in order to provide replacement solutions in increased volume in correspondence with the increased rate of loss through adherence to the web. Correspondingly, if the drive motor is operating at a relatively slower rate and the web is travelling through the system at correspondingly lower speed, the reagent feeding pumps will be automatically adjusted to lower rates of operation.

All of the ancillary equipment utilized in the satisfactory operation of the present system on a continuous basis is not shown in detail, since it is not an essential part of the invention. Such equipment includes means for continuously and automatically analyzing the reagent solutions in their make-up tanks to assure that they meet the desired standards of uniformity and purity. Also provided are pumping, heating and cooling means for conditioning and circulating the reagents, wash water, bearing fluids and the like through the system. Means are also provided for supplying softened or, preferably de-ionized water for use in formulating treating solutions and for spray rinsing the webs.

It is also advantageous to house the entire system in a sealed room supplied with filtered and purified air, so that all external impurities are excluded from the product.

*The method*

In operation of the previously described apparatus to accomplish a preferred embodiment of the present method, the system is initially threaded with a Mylar web 30 that is 24 inches wide and having a thickness of approximately three mils. The substrate upon which final plating is to be carried out is also a Mylar web of the same width but approximately 0.25 to 10 mils in thickness. The reason for using a heavy leader is that the greater thickness adds durability and strength to the substrate, so that it can withstand rough treatment during the start-up operation. The web is taken from supply reel 16 mounted in a Stanford reel holding and web tensioning and aligning stand 17.

The first major adjustment to be made is to see that the web is supported and guided throughout the various operations solely on a series of fluid bearings which are rigidly mounted across the path of the web and except for the electroplating contact roll and its associated back-up roll the web is not touched during the process. This initial adjustment is made by pumping air under pressure through all of the bearings and checking the web at each bearing to be sure that there is no contact or friction with the surface of the web. The correctness of this adjustment is critical, since it is essential to the attainment of a high quality product that surface contact with the web be entirely avoided, aside from the noted exception in the electroplating cell.

Figure 1B:
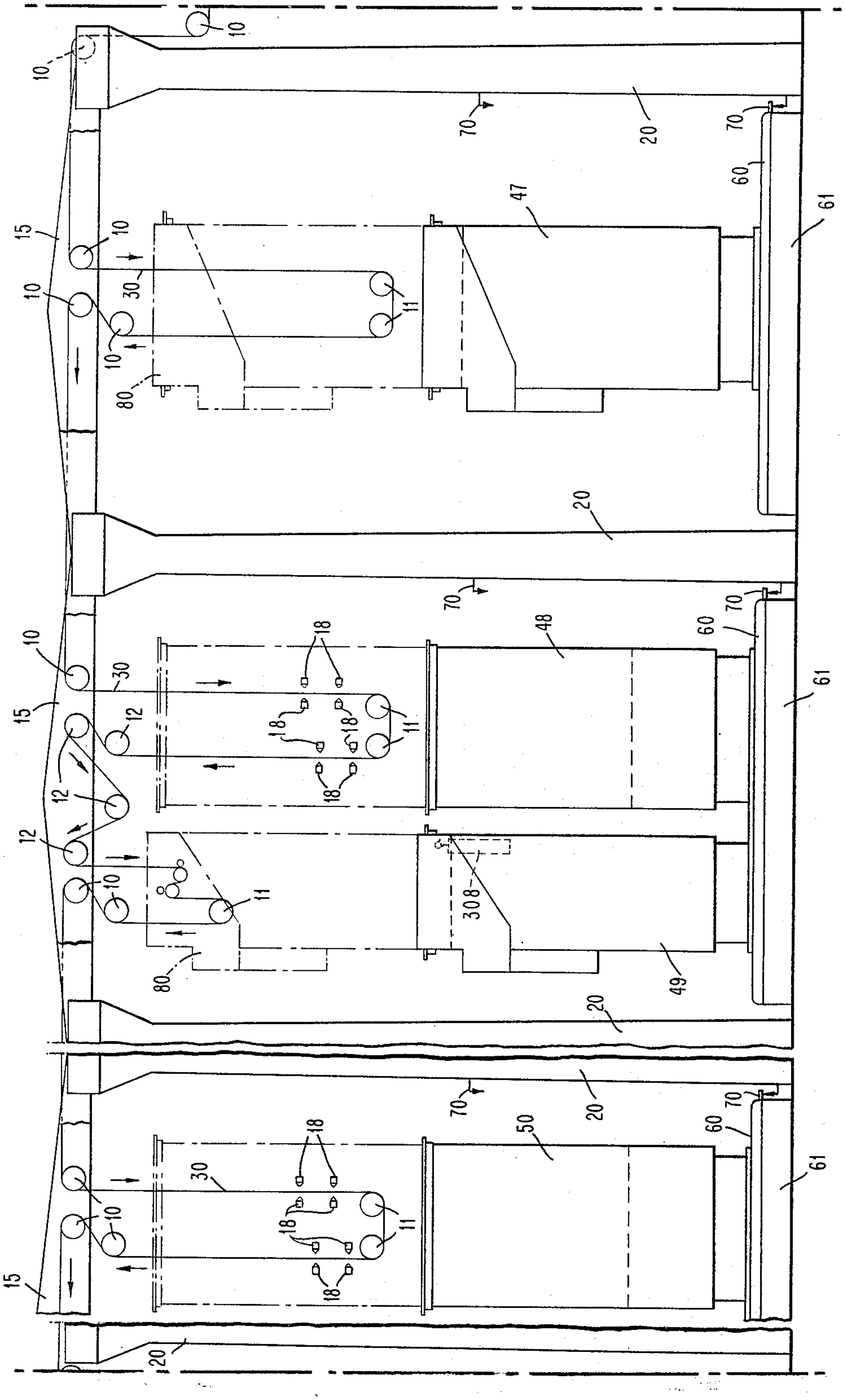
Figure 1C:
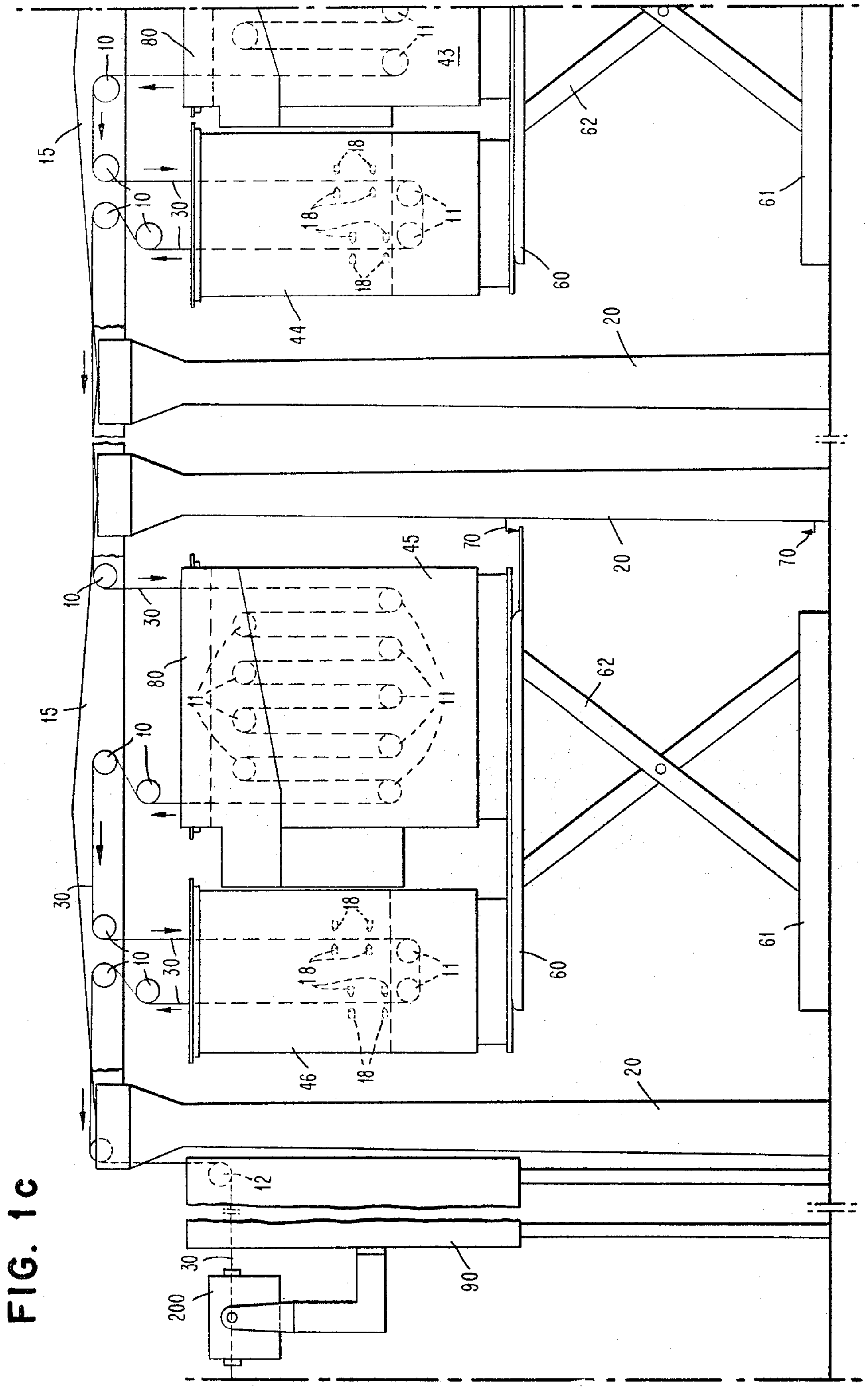

During this adjustment, all of the tanks 40–50 are in a lowered position as shown by the solid lines in FIGURES 1*a* and 1*b*.

Figure 1D:
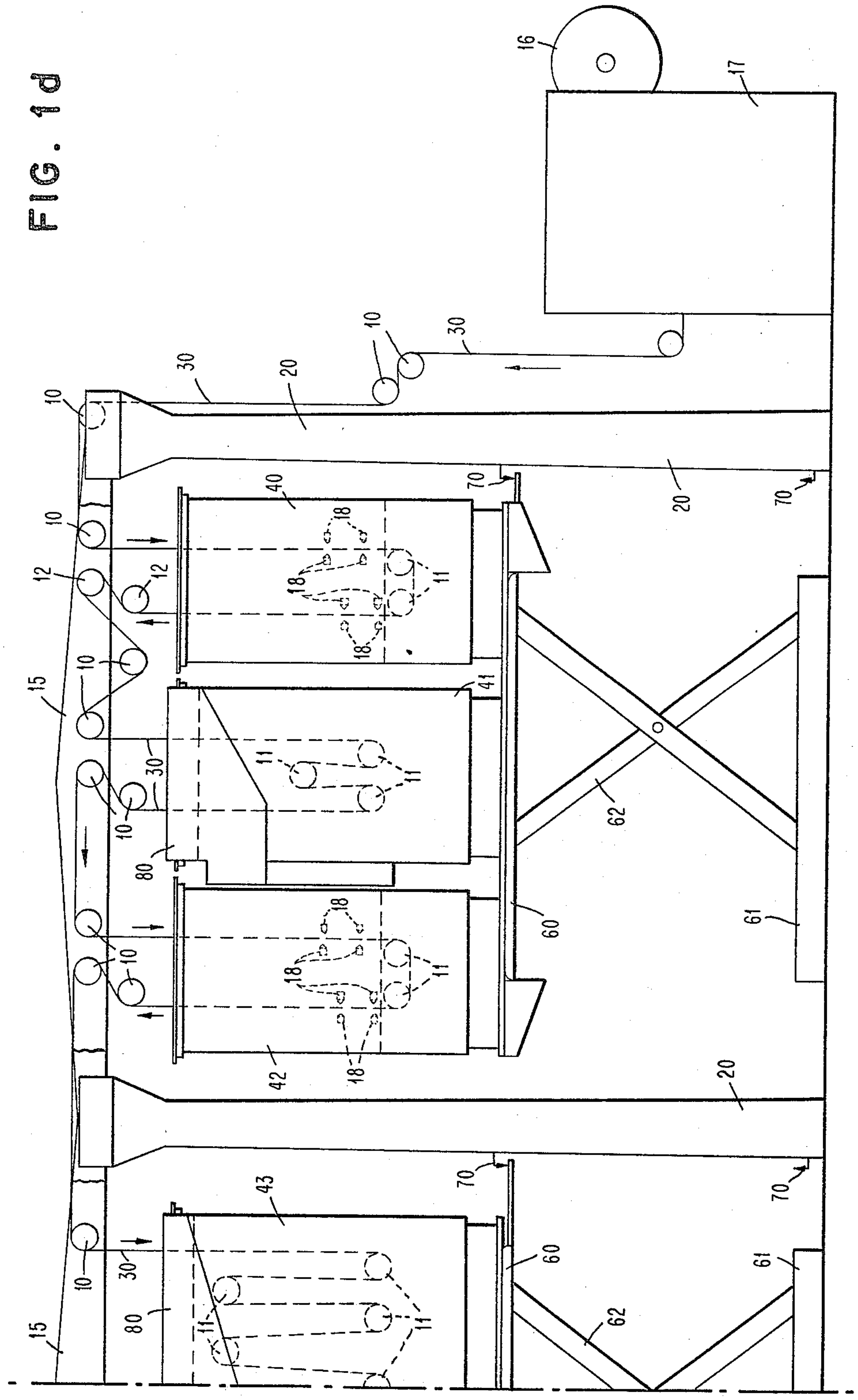

Next, each of the tanks, starting with the pre-washing tank 40, is raised into contact with the web, as shown in FIGURES 1*c* and 1*d*. As the bearings 11 are immersed in the liquid contained in the various treating tanks, a switch, not shown, actuated by the elevation of the tanks automatically shuts off in the air pressure fluid being pumped to the bearings through conduit 102 and starts pumping liquid. The liquid circulated through the bearings is the same liquid present in the tanks so that there is no dilution or alteration of the chemical composition of the bath.

Preferably, means are provided whereby the web that is to be plated is joined by a flying splice to the trailing end of the leader and is drawn through the system at a constant rate of speed. The motor operating the drive rollers is capable of several speeds and a rate of from five to thirty feet per minute is generally satisfactory.

The web 30 is drawn by rollers 440, from supply reel 16, over air bearings 10 into pre-wash tank 40. Tank 40 contains approximately 38 gallons of a 0.01 percent solution of Triton X–100 in water, or (de-ionized) water alone. Other synthetic wetting agents such as Tergitol may also be employed. The wash solution is removed, replenished and recirculated by suitable means, not shown, at the rate of about ten gallons per minute (g.p.m.). The web is immersed in this bath for approximately fifteen seconds and is sprayed with de-ionized water from nozzles 18 to assist in the washing action.

The web is conducted through bath 40 over bearings 11 which are provided with liquid bearing medium recirculated from tank 40. Bearings 12 dry water and washing solution from the web to prevent dilution of the solution in tank 41.

The web is next drawn through tank 41 containing a pre-treating solution of sodium dichromate, water and sulphuric acid. The dwell time in this tank is approximately 30 seconds and the tank is lead lined to prevent corrosion. The immersed bearings are preferably manufactured of stainless steel, such as Hastelloy C, for the same purpose. Tank 41 has a capacity of 139 gallons which is recirculated at the rate of 10 g.p.m. Bath 41 preferably has the following composition:

38 g./l. sodium dichromate (dihydrate)
740 ml./l. 66° Baumé technical sulphuric acid
249 ml./l. water Next the web is drawn through a water rinsing tank 42 and sprays 18 to affect removal of residual dichromate-sulphuric acid from the surface.

The web is next drawn through three tanks of the same structure as tank 43 and intermediate rinse tanks identical with tank 44. The system as illustrated is broken at this point to indicate that three similar treatment and rinsing units are to follow, but the additional tanks are not shown in view of the structural similarity.

The additional units each accomplish a specific chemical pre-treatment or sensitizing operation separated by a rinse with de-ionized water. The treatments include contacting the web with hot sodium hydroxide, a dilute stannous ion sensitizing solution and a dilute palladium ion sensitizing solution, in that order.

The next treating bath 43 through which the web is drawn after tank 42 contains a 3.3 N hot aqueous sodium hydroxide solution and the web is immersed in the solution for approximately 45 seconds.

After completion of the sodium hydroxide treatment the web is successively sensitized by exposure to a tin chloride solution and a palladium chloride solution with rinsing after each exposure. The tin chloride solution comprises 30 g./l. stannous chloride (dihydrate), 10 ml./l. hydrochloric acid, and the balance water. The palladium chloride solution comprises 0.1 g./l. palladium chloride, 10 ml./l. hydrochloric acid and the balance water.

All of the previously recited steps cooperate towards the formation of a surface film on the web which is highly receptive to and catalytic for the electroless deposition of a preliminary metal film. By the same token, the mobile surface film is very susceptible to scratching and abrasion in response to even slight frictional engagement with a solid surface. We have established that the fragile nature of this sensitive surface film has been the primary cause of imperfections in tape products which we initially produced using the general process. Therefore, as we have already described, it is essential to successful performance of the invention that the web be conducted through each of the preliminary surface preparation and sensitizing the steps over frictionless guiding and support bearings.

The prepared web is then drawn through an electroless plating tank 45 wherein a thin film of metal is deposited on the sensitized surface. The duration of this treatment is about 50 seconds and a nickel film of approximately 5 to 10 microinches thickness is deposited.

The electroless bath has the following composition:

18 g./l. nickel sulfate (six hydrate)
24 g./l. sodium hypophosphite (hydrated)
16 g./l. sodium succinate
31 ml./l. 85% lactic acid
4.8 g./l. sodium acetate
3.6 ml./l. glacial acetic acid
5 p.p.m. Pb ions (added as lead acetate)
10 g./l. sodium hydroxide The electroless plating tank 45 has a capacity of 215 gallons, recirculated at 20 p.p.m., is double walled for insulation and may also be provided with a hood for drawing off hydrogen gas evolved during the deposition. The bearings 11 immersed in the electroless plating solution are preferably of passivated stainless steel to avoid plating on the same.

The electroless plating solution is maintained at about 180°–210° F. in tank 45 for optimum plating and is cooled to about 140° F. during recirculation and storage to prevent spontaneous decomposition. The pH of the bath is adjusted to approximately 5.2.

After the electroless deposition, the web is rinsed in a spray tank 46 and is then drawn over a plurality of hot air bearings 12 in a drying oven 90. The temperature in the oven is preferably maintained at 225°–250° F. The web is heated in the oven for approximately three minutes. A separate drying medium may also be introduced into the oven to attain the proper temperature.

It is important to note at this point that at the electroless film deposited on the sensitized surface of the web is also extremely delicate and subject to disruption under even slight friction. Accordingly, the web is still drawn through the electroless deposition tank 45, rinse tank 46 and the drying oven 90 on a series of frictionless fluid bearings in order to obtain the desired tape product. The drying operation after the electroless deposition serves to stabilize the film somewhat and improve its durability and the adherence of the deposit to the web, but care must still be taken to avoid excessive surface friction.

The electrolessly plated web is then drawn through a photoelectric inspection station 200 to insure that the proper thickness of metal has been plated. This is done by measuring the increase in opacity of the normally transparent Mylar film. Any unplated portions are also readily detected in this operation.

The electrolessly plated web is then drawn through a depassivation tank 47 where it is treated with a 3 percent solution of hydrochloric acid. Exposure to this solution removes any surface oxide which may be produced during the previous drying operation and which may insulate the electroless film and impair its proper electroplating. The web is thoroughly dried after leaving the depassivation tank by being passed over hot air bearings 12 so as to avoid electrolytic interaction with the cathode rolls.

The structure and operation of the electroplating cells 49 have been already described in some detail in connection with FIGURE 8 of the drawing. In the present preferred embodiment, three additional units of rinsing and electroplating tanks of the same structure as 48 and 49 are provided. To avoid unnecessary repetition in the drawing, however, only one electroplating station is shown, rather than four, the drawing being broken after tank 49 in FIGURE 1*b* to indicate the point at which the additional three units are to be included.

In the first of the four electroplating cells 49, the web is then drawn down through an electrolyte solution having the following composition and capable of depositing a magnetic film of approximately 80 percent cobalt, 20 percent nickel, including a small amount (about 2 percent) of phosphorous.

100 g./l. ammonium chloride
96 g./l. cobalt sulfate (seven hydrate)
66 g./l. nickel sulfate (six hydrate)
0.5 g./l. sodium hypophosphite
1 ml./l. Tergitol-wetting agent Due to the relatively high resistivity of the electroless deposit, the web can be effectively plated only at a short distance from the contact roll and the depth of immersion of the web into the electrolyte is adjusted accordingly. The current at the first plating station is approximately 0.5 to 2.0 amps/in. width of web.

The second, third and fourth electroplating stations contain electrolytes and anodes of the same composition. A cell structure identical to tank 49 is also utilized.

A current of about 1–3 amps/in. is carried in the second cell, 1.5–3.5 amps/in. in the third and 2.0–4.0 amps/in. in the fourth and final station. The total thickness of the electroplated magnetic layer may of course be varied, but a layer about 3–10 microinches thick over an electroless deposit of 3–15 microinches provides a tape having extremely high bit density of up to 40,000 flux changes/in. and also having the adherence, smoothness and durability required for operation at speeds near 1000 inches/sec.

After electroplating is completed, the web is dried in oven 190 at about 225° F. for three minutes.

Information is then written on the magnetic surface in inspection station 400 and is read to verify that the product has the proper output.

The web is next guided over bearings 10 in stand 410 and then over skewed roller 420 for further alignment. Finally, the web is drawn between driven rollers 440 onto reel 430. Motor 450 is operated so as to draw the web by rollers 440 through the entire system at a constant speed of 5–30 feet/min. and under a mean tension of ⅓ lb./in. of width or less, or 8 lbs. or less for the 24-inch wide roll of the previous description.

*The products*

The magnetic materials produced with the foregoing method and apparatus comprise a web of non-conducting material having at least one side coated with an adherent electroless metal deposit. An electro-deposited film of a magnetic metal or alloy is in turn adhered to the electroless deposit.

In the preferred embodiment the electroless film is nickel and the magnetic layer is an alloy of cobalt and nickel. Other metals may of course be substituted for these to obtain similar products within the teaching of our invention.

As previously noted, the electroplating cells are provided with cathode rolls 300 and 302 for contacting both sides of web 30, so that both sides are plated during immersion in the electrolyte. Plating of both sides has been found desirable to overcome the tendency of the tape to curl when plated on one side only. Where magnetic materials produced according to the invention are utilized in systems where curling is not a factor, only one side need be plated with a magnetic film.

Any suitable means may be selected to avoid plating on the reverse side of the tape, such as restricting electroless plating to one side only, insulating the back of the tape from the front by slitting thin edge margins from the tape after electroless deposition and contacting only one side of the tape with a cathode roll.

An electorless film of 3–15 microinches and an electrolytic film of 3–10 microinches yield products of exceptional characteristics. Clearly other thicknesses for the respective coatings will also be operable, and are still within the scope of the present teachings.

It should be noted that, since apparatus and methods in accordance with the invention are well adapted to production of a plated web or "tape" of considerable width, such as the 24 inch width mentioned hereinabove, such a web may be cut with facility, not only into standard recording tape ribbon form, but also into other shapes such as rectangular card or disk forms.

Likewise, minor variations in the process and apparatus may occur to those skilled in the art, but it will be understood that such modifications will not exceed the spirit of the invention.

While there have been shown and described and pointed out the fundamental novel features of the invention as applied to the preferred embodiment, it will be understood that various omissions and substitutions and changes in the form and details of the products, the device illustrated and in its operation may be made by those skilled in the art without departing from the spirit of the invention. It is the intention, therefore, to be limited only as indicated by the scope of the following claims.

What is claimed is:

1. Apparatus for continuously depositing a layer of magnetic metal or metal alloy on the surface of a non-conducting web comprising a series of stationary fluid bearings defining a continuous web processing path, a plurality of web sensitizing tanks, an electroless plating tank and at least one electroplating cell all positioned beneath said fluid bearings, a heating chamber surrounding at least some of said fluid bearings between said electroless plating tank and said electroplating tank, means for raising and lowering said sensitizing tanks, said electroless plating tanks and said electroplating cell into and out of contact with a web threaded through said fluid bearings, means for drawing said web over said fluid bearings, and means for selectively pumping pressurized air to the fluid bearings out of contact with liquid in said tanks and pressurized liquid to the fluid bearings when immersed in liquid in said tanks of the system.

2. In a system for the production of a magnetic layer on a non-conducting web by sequential electroless and electroplating, frictionless transport means for the web comprising a fluid bearing, said bearing comprising a closed tube rigidly mounted transversely to the path of said web, at least two longitudinal grooves and two circumferential grooves in the outer surface of said tube, said longitudinal and circumferential grooves intersecting and enclosing a generally rectangular area on the surface of said tube, a conduit communicating with the interior of said tube for admitting a pressurized fluid bearing medium, and a plurality of fluid outlets through the wall of said tube communicating with said longitudinal and circumferential grooves for directing fluid bearing medium against the surface of a web drawn against said enclosed area on the surface of said tube and for maintaining the web in spaced relation to said fluid bearing.

3. Apparatus as set forth in claim 2 wherein the density of said fluid outlets is greater near the middle of said longitudinal grooves than at the ends of said longitudinal grooves.

4. Apparatus as set forth in claim 2 further comprising means for selectively introducing a pressurized liquid bearing medium into said closed tube when said bearing is immersed in liquid and introducing a pressurized gaseous bearing medium when said bearing is in air.

5. Apparatus as set forth in claim 2 wherein the walls forming said longitudinal and circumferential grooves are not symmetrical, the wall nearer to said enclosed area being more gently sloped than the other wall to direct the fluid bearing medium towards the center of said enclosed area.

References Cited by the Examiner

UNITED STATES PATENTS

| | | | |
|---|---|---|---|
| 1,899,449 | 2/1933 | Wallsten | 204—207 |
| 2,035,517 | 3/1936 | Yates | 204—207 |
| 2,142,512 | 1/1939 | Hartel | 204—212 |
| 2,395,437 | 2/1946 | Venable | 204—206 |
| 2,446,549 | 8/1948 | Nachtman | 204—206 |
| 2,853,442 | 9/1958 | Swanton | 204—28 |
| 2,908,495 | 10/1959 | Andrews | 226—95 |
| 2,921,893 | 1/1960 | Smith | 204—206 |
| 2,930,739 | 3/1960 | Burhmah | 204—28 |
| 2,989,265 | 6/1961 | Selsted | 308—9 |
| 2,998,372 | 8/1961 | Wagner | 204—206 |
| 3,038,852 | 6/1962 | Meuter | 204—212 |
| 3,073,773 | 1/1963 | Manson | 204—207 |

FOREIGN PATENTS

| | | |
|---|---|---|
| 176,064 | 1922 | Great Britain. |

JOHN H. MACK, *Primary Examiner.*

JOSEPH REBOLD, *Examiner.*

R. L. GOOCH, T. TUFARIELLO, *Assistant Examiner.*